United States Patent [19]

Hoff

[11] 4,394,273

[45] Jul. 19, 1983

[54] DEFOAMERS FOR AQUEOUS LIQUIDS CONTAINING SOLUBLE ZINC SALTS

[75] Inventor: Michael H. Hoff, Houston, Tex.

[73] Assignee: NL Industries, Inc., New York, N.Y.

[21] Appl. No.: 329,350

[22] Filed: Dec. 10, 1981

[51] Int. Cl.³ .................... C09K 7/02; E21B 43/00; B01D 19/04
[52] U.S. Cl. .......................... 252/8.55 R; 252/8.5 A; 252/321; 252/358
[58] Field of Search ............ 252/8.5 A, 8.5 B, 8.55 R, 252/321, 358

[56] References Cited

U.S. PATENT DOCUMENTS

| | | | |
|---|---|---|---|
| 2,363,922 | 11/1944 | Denman | 252/321 |
| 2,575,298 | 11/1951 | Ryznar | 252/321 |
| 3,396,105 | 8/1968 | Burdyn et al. | 252/8.5 |
| 4,292,183 | 9/1981 | Sanders | 252/8.55 |
| 4,304,677 | 12/1981 | Stauffer et al. | 252/8.55 |
| 4,330,414 | 5/1982 | Hoover | 252/8.55 |

*Primary Examiner*—Herbert B. Guynn
*Attorney, Agent, or Firm*—Browning, Bushman, Zamecki & Anderson

[57] ABSTRACT

2,6,8-Trimethyl-4-nonanone and the triethoxylated derivative of 2,6,8-Trimethyl-4-nonanol synergistically combine to reduce the foaming of heavy brines containing zinc bromide and one or more soluble salts from the group calcium chloride and calcium bromide.

9 Claims, No Drawings

DEFOAMERS FOR AQUEOUS LIQUIDS CONTAINING SOLUBLE ZINC SALTS

BACKGROUND OF THE INVENTION

The present invention relates to aqueous liquids containing a soluble zinc salt, and more particularly, to so called heavy brines having a density of about 14.2 pounds per gallon (ppg) or greater.

In recent years, the practical operating range of clear brines for use in the oil and gas industry has been significantly extended by utilizing soluble zinc salts, particularly zinc bromide, so that the advantages of clear brines can now be obtained with fluids having densities as high as 19.2 ppg at ambient temperatures and pressures.

The high density clear brines are used extensively: as completion fluids, to minimize plugging of perforation tunnels, to protect formation permeability, and to minimize mechanical problems; as workover fluids, for the same reasons; as packer fluids, to allow easy movement and retrieval of the packer; for underreaming, gravel-pack and sand consolidation applications; as kill fluid or ballast fluid; for wire-line work; and as drilling fluids.

Clear brines having a density of 14.2 ppg or lower are generally formulated to contain sodium chloride, sodium bromide, potassium chloride, calcium chloride, calcium bromide, or mixtures of these salts. Clear brines having a density up to about 15.2 ppg can be formulated with calcium chloride and calcium bromide; however, if the brine must have a low crystallization temperature, then clear brines in this density range are generally formulated to contain a soluble zinc salt. Zinc bromide is preferred because brines containing it are less corrosive than brines containing zinc chloride. Clear brines having a density greater than about 15.2 ppg are formulated to contain zinc bromide.

Viscous clear fluids are sometimes desired. Generally, hydroxyethyl cellulose (HEC) and xantham gum (XC) polymers are compatible with the fluids which do not contain zinc salts. However, at the higher densities, the hydration of the viscosifiers is significantly slower. HEC is generally considered as unsatisfactory for use in fluids containing zinc salts. However, methods of activating HEC, XC polymer, and other water soluble polymers such that they readily hydrate in heavy brines containing zinc bromide have been disclosed in the following co-pending patent applications, incorporated herein by reference for all purposes: Ser. No. 119,805 filed Feb. 8, 1980, now U.S. Pat. No. 4,330,414, for Dispersible Hydrophilic Polymer Compositions; Ser. No. 196,367 filed Oct. 14, 1980, for Dispersible Hydrophilic Polymer Compositions; Ser. No. 146,286 filed May 5, 1980, for Compositions and Method for Thickening Aqueous Brines; and Ser. No. 161,444 filed June 20, 1980, for Thickened Heavy Brines.

It has been found that clear heavy brines containing soluble zinc salts foam upon mixing. In the presence of a hydrophilic polymer viscosifier such as HEC, the foam is stabilized to the extent that an excessive aging time is required to allow the foam to break and be eliminated.

SUMMARY OF THE INVENTION

I have now found that a particular combination of materials synergistically decreases the foaming of heavy brines containing a soluble zinc salt and thus can be utilized as defoamers and anti-foaming agents for such brines.

It is therefore an object of the present invention to provide a new composition which is useful for eliminating the formation of a stable foam in heavy brines containing a soluble zinc salt.

It is another object of this invention to provide a method of eliminating the formation of a stable foam in heavy brines containing a soluble zinc salt.

Still another object of this invention is to provide improved heavy brine well servicing fluids.

A further object is to provide improved viscous heavy brine well servicing fluids.

DESCRIPTION OF THE PREFERRED EMBODIMENT

The present invention is based on the discovery that certain blends of 2,6,8-trimethyl-4-nonanone (TMN) and the triethoxylated derivative of 2,6,8-trimethyl-4-nonanol (TETMN) synergistically interact to decrease the foaming in heavy brines containing a soluble zinc salt, particularly zinc bromide.

The volume ratio of TETMN to TMN in the defoaming composition should be in the range from about 9:1 to about 1:9, preferably from about 7:1 to about 1:7, and most preferably from about 5:1 to about 1:5.

The concentration of the defoaming composition used to prevent foaming or to eliminate the foam from heavy brines containing a soluble zinc salt need only be an effective amount, generally from about 0.01 to about 5.0 milliliters per 42 gallon barrel (mpb) of brine, preferably from about 0.05 to about 0.5 mpb.

The heavy brines in which the TMN and TETMN interact to synergistically decrease foaming may contain from about 1% to about 60% by weight of a soluble zinc salt, preferably zinc bromine. The remaining soluble salts in the heavy brines are generally calcium chloride and/or calcium bromide. Preferably the heavy brine will contain at least about 16% zinc bromide, most preferably at least about 20% zinc bromide.

It is preferred that the heavy brines of this invention containing a foam eliminating amount of the defoaming composition of this invention also contain a hydrophilic polymer hydrated therein, particularly hydroxyethyl cellulose. Most preferably the hydroxyethyl cellulose shall have been activated for use in heavy brines containing zinc bromide, such as by the methods disclosed in the co-pending patent application previously incorporated herein by reference. The HEC will generally be present in a concentration of from about 1 pound per 42 gallon barrel (ppb) to about 5 ppb.

To more fully illustrate the present invention, the following non-limiting examples are presented. Unless otherwise indicated, all physical property measurements were made in accordance with testing procedures set forth in STANDARD PROCEDURE FOR TESTING DRILLING FLUID, API RP 13B, Seventh Edition, April, 1978. The physical property parameters referred to in the examples, unless otherwise indicated, are in units expressed as follows:

AV = apparent viscosity, centipoise
PV = plastic viscosity, centipoise
YP = yield point, pounds per 100 square feet
gel strength = pounds per 100 square feet

EXAMPLE 1

Various blends of 2,6,8-trimethyl-4-nonanone (TMN) and triethoxylated 2,6,8-trimethyl-4-nonanol (TETMN),

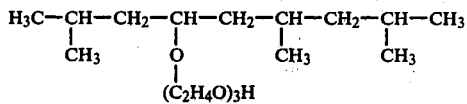

were prepared by mixing. These blends were evaluated as defoamers as follows: (1) 350 milliliters of brine were mixed with 7.5 grams of an activated hydroxyethyl cellulose gellant composition containing 20% NATROSOL 250 HHR hydroxyethyl cellulose, 25% glycerol, 0.4% CAB-O-SIL MS fumed silica, and 54.6% isopropanol for 5 minutes on a Multimixer; (2) after 4 minutes mixing there were added the defoamer blends listed in Table 1; (3) immediately after mixing the brines were poured into graduated cylinders; (4) the height of foam was noted and thereafter observed at one minute intervals; and (5) the test was terminated after 5 minutes if the foam had not dissipated. Two brines were used having the following properties: Brine A-17.1 pounds per gallon containing 7.15% calcium chloride, 30.2% calcium bromide, and 32% zinc bromide in water. Brine B-19.2 pounds per gallon containing 20% calcium bromide and 57% zinc bromide in water. The observed time for foam elimination is given in Table 1.

The data indicate that the TETMN and TMN synergistically reduced the time required for foam elimination.

TABLE 1

| BLEND NUMBER | VOLUME RATIO TETMN TMN | VOLUME OF BLEND ml | EQUIVALENT VOLUME OF TETMN ml | EQUIVALENT VOLUME OF TMN ml | MINUTES FOR FOAM ELIMINATION | |
|---|---|---|---|---|---|---|
| | | | | | BRINE A | BRINE B |
| — | — | — | 0.20 | 0 | 5 | 4 |
| — | — | — | 0.10 | 0 | 4 | 4 |
| — | — | — | 0 | 0.20 | 2 | 2 |
| — | — | — | 0 | 0.10 | 2 | 3 |
| — | — | — | 0 | 0.05 | 4 | 4 |
| 1 | 7/1 | 0.20 | 0.175 | 0.025 | 1 | 2 |
| 2 | 3/1 | 0.20 | 0.15 | 0.05 | 0 | 1 |
| 3 | 1/1 | 0.20 | 0.10 | 0.10 | 0 | 1 |
| 4 | 1/3 | 0.20 | 0.05 | 0.15 | 0 | 1 |
| 5 | 1/7 | 0.20 | 0.025 | 0.175 | 1 | 3 |
| 6 | 1/1 | 0.10 | 0.05 | 0.05 | 0 | 2 |
| 7 | 1/1 | 0.05 | 0.025 | 0.025 | 0 | 2 |

EXAMPLE 2

A 1/1 blend of TMN and TETMN was evaluated for its effect on the rheological properties of this brine, viscosified with HEC, as follows: (1) viscosified brines were prepared containing 350 milliliters of Brine A or Brine B, 7.5 grams of gellant A or gellant B, and 0.20 grams of the 1/1 blend by mixing on a Multimixer for 5 minutes and rolling the brines in a roller oven at room temperature for sixteen hours; (2) the rheological properties were obtained; (3) the viscosified brines were rolled at 150° F. (65.5° C.) for 16 hours; and (4) the rheological properties were obtained after cooling to room temperature. The data obtained are given in Table 2. Gellant A contains 20% NATROSOL 250 HHR hydroxyethyl cellulose, 25% glycerol, 0.4% CAB-O-SIL M5 fumed silica, and 54.6% isopropanol. Gellant B contains 20% NATROSOL 250 HHR, 22% of 0.25 N NaOH, and 58% isopropanol.

The data indicate that this defoamer blend had no deleterious effect on the rheological properties of this brine.

TABLE 2

| DEFOAMER BLEND lb./bbl. | GELLANT | BRINE | TEMP. OF ROLLING | API RHEOLOGICAL CHARACTERISTICS | | | GEL STRENGTHS | |
|---|---|---|---|---|---|---|---|---|
| | | | | AV | PV | YP | 10 Sec. | 10 Min. |
| NONE | A | A | R.T. | 44.5 | 41 | 7 | 1 | 1 |
| 0.20 | A | A | R.T. | 46.5 | 43 | 7 | 1 | 1 |
| NONE | A | A | 150 | 170$^a$ | — | — | 16 | 16 |
| 0.20 | A | A | 150 | 170$^a$ | — | — | 16 | 16 |
| NONE | A | B | R.T. | b | — | — | 38 | 40 |
| 0.20 | A | B | R.T. | b | — | — | 34 | 36 |
| NONE | A | B | 150 | 216$^a$ | — | — | 36 | 37 |
| 0.20 | A | B | 150 | 207$^a$ | — | — | 34 | 34 |
| NONE | B | A | R.T. | 84.5 | 66 | 37 | 4 | 4 |
| 0.20 | B | A | R.T. | 84.5 | 67 | 35 | 3 | 3 |
| NONE | B | A | 150 | 254$^a$ | — | — | 30 | 34 |
| 0.20 | B | A | 150 | 262$^a$ | — | — | 32 | 34 |
| NONE | B | B | R.T. | 129.5 | 81 | 97 | 20 | 22 |
| 0.20 | B | B | R.T. | 127 | 82 | 90 | 19 | 19 |
| NONE | B | B | 150 | 219$^a$ | — | — | 26 | 26 |
| 0.20 | B | B | 150 | 222$^a$ | — | — | 26 | 26 |

$^a$300 rpm reading
$^b$>150, too viscous to measure

I claim:

1. A defoaming composition comprising a mixture of 2,6,8-trimethyl-4-nonanone and the triethoxylated derivative of 2,6,8-trimethyl-4-nonanol wherein the volume ratio of 2,6,8-trimethyl-4-nonanone to the triethoxylated derivative of 2,6,8-trimethyl-4-nonanol is in the range from about 9:1 to about 1:9.

2. The composition of claim 1 wherein said volume ratio is in the range from about 7:1 to about 1:7.

3. The composition of claim 1 wherein said volume ratio is in the range from about 5:1 to about 1:5.

4. A method of decreasing the foam which forms on mixing an aqueous brine containing a soluble zinc salt which comprises mixing with the brine the defoaming composition of claim 1, 2, or 3.

5. A method of decreasing the foam which forms on mixing an aqueous brine containing zinc bromide which comprises mixing with the brine the defoaming composition of claim 1, 2, or 3.

6. A method of decreasing the foam which forms on mixing a heavy brine having a density greater than about 14.2 pounds per gallon containing at least 20% by weight zinc bromide with a composition containing hydroxyethyl cellulose which comprises mixing with the brine the defoaming composition of claim 1, 2, or 3.

7. A heavy brine well servicing fluid which comprises an aqueous solution having a density greater than about 14.2 pounds per gallon and the defoaming composition of claim 1, 2, or 3.

8. A heavy brine well servicing fluid which comprises an aqueous solution having a density greater than about 14.2 pounds per gallon, from about 1 to about 5 pounds per 42 gallon barrel of hydroxyethyl cellulose, and from about 0.01 to about 5.0 milliliters per 42 gallon barrel of the defoaming composition of claim 1, 2, or 3.

9. A heavy brine well servicing fluid which comprises an aqueous solution having a density greater than about 14.2 pounds per gallon, from about 1 to about 5 pounds per 42 gallon barrel of hydroxyethyl cellulose, and from about 0.05 to about 0.5 milliliters per 42 gallon barrel of the defoaming composition of claim 1, 2, or 3.

* * * * *